Sept. 28, 1943.    A. L. ROMERO    2,330,242
REAMER
Filed Aug. 25, 1941
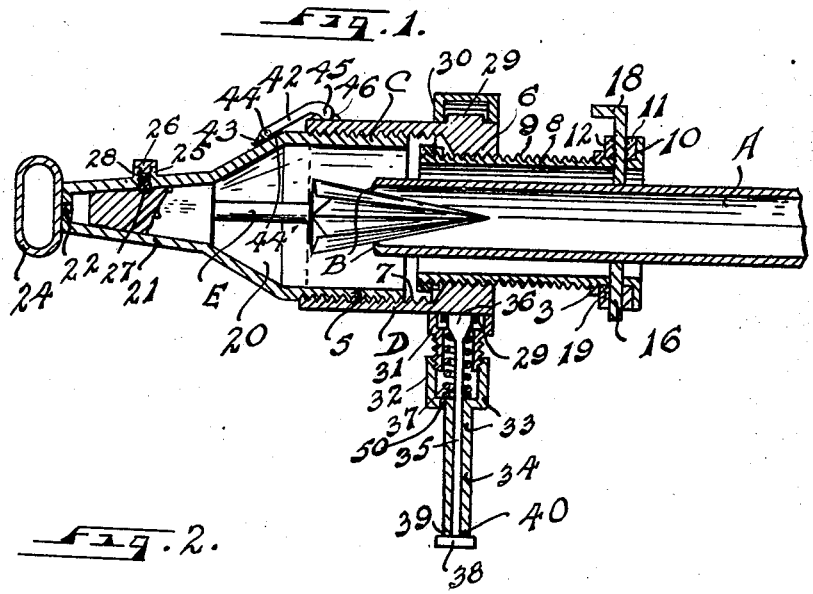
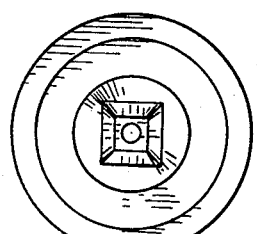
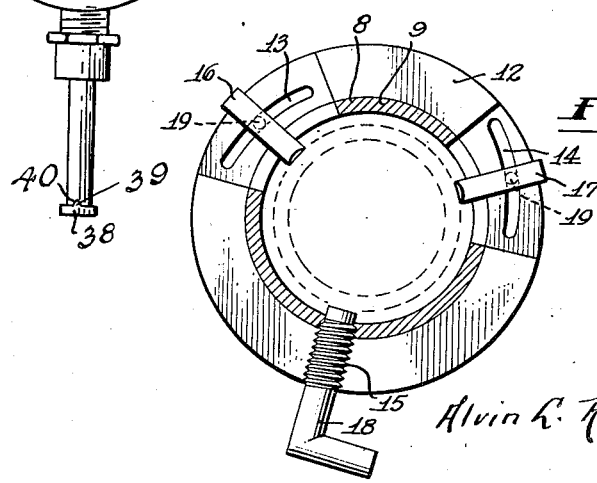
Inventor
Alvin L. Romero
By R. M. Thomas
Attorney Patented Sept. 28, 1943

2,330,242

UNITED STATES PATENT OFFICE 2,330,242

REAMER

Alvin L. Romero, Downey, Idaho

Application August 25, 1941, Serial No. 408,200

3 Claims. (Cl. 77—73)

My invention relates to reamers and has for its object to provide a new and efficient reamer for reaming out the burr of pipe after it has been cut off.

A further object is to provide a reamer which will cut out the burr on pipe formed by cutting the pipe with the usual V-shaped pipe cutter, and which will cut off the burr more evenly and efficiently than the usual type reamer.

A still further object is to provide a reamer for pipes which will be screw fed, so that the reamer when rotated will feed itself into the pipe automatically with the rotation of the control handle, and one which may be rotated in either direction, with the feed to either force the reamer into the pipe or withdraw it therefrom.

A still further object is to provide a reamer for cutting out the burr of pipes which will be quickly removable from the pipe and in which the reamer or cutter may be removed and replaced quickly and easily.

These objects I accomplish with the device illustrated in the accompanying drawings in which similar numerals and letters of reference indicate like parts throughout the several views and as described in the specification forming a part of this application and pointed out in the appended claims.

In the drawing in which I have shown the best and most preferred manner of building my invention, Figure 1 is a section longitudinally and diametrically through the tool. Figure 2 is an end view thereof. Figure 3 is a view showing the operating plate and jaws used to hold the pipe in place, dotted lines indicating the pipe, and showing the casing on which the pipe chuck is carried sectioned, the entire view being enlarged over the other views in the drawing.

In the drawing I have shown the pipe to be reamed as A, the burr therein as B, and the casing of my device as C. The casing of my device is formed of a cylindrical casing 5 having one end open. The casing 5 is externally threaded to screw into an outer casing D threaded internally at 7. The outer casing D is formed with a constricted or inwardly extending flange 6 internally threaded to receive a cylindrical casing 8. The cylindrical casing 8 is externally threaded at 9, with the threads 9 and threads of the flange 6 engaging, said threads being formed of a slow pitch so that when the casing D is rotated around the casing 8, the longitudinal movement of the casing D on the casing 8 caused by the threads, will be slow. The outer free end of the casing 8 is provided with a flange 10, and adjacent the flange I provide a ring plate 11, and adjacent the plate 11, I provide another plate 12, which plate 12 is provided with two spaced apart curved tracks 13 and 14. The face of the plate is divided into sixths and the midpoints of tracks 13 and 14 are ⅓ of the circumference apart; and through the other or third side of the said plate 12 and through a similar portion of the plate 11, I provide a radially extended threaded hole 15. Through the other two third portions of the two ring plates I provide radial holes therethrough, through which holes I place chuck jaws 16 and 17. Within the threaded hole I place a chuck jaw and lever 18, which jaw is used to rotate the chuck and to screw down to hold the chuck from loosening while the reamer is being used. The inner ends of the jaw 18 and the inner ends of the jaws 16 and 17 are formed concave so that there is a sharp flange around the outer edge thereof. The two jaws 16 and 17 are each provided with a lug 19 which lug is adapted to fit into the tracks 13 and 14 to move the jaws inwardly or outwardly when the chuck is rotated by the jaw lever 18. A retainer ring 3 is screwed onto the casing 8 to hold the two rings in place. One end of the casing C is formed frusto-conical at 20 and the end thereof is formed into a frusto-pyramid 21 having the top end of the frustum closed at 22, and perforated to receive a handle 24. One side of the frusto-pyramidical portion 21 of the casing is provided with a perforated boss 25 thereon and said boss is internally threaded to receive a threaded plug 26 and within the hole in the boss 25, I place a locking ball 27, which is held in position at all times by a spring 28, which spring is placed between the ball and the plug 26. Around the periphery of the flange 6 of the casing D, I provide teeth 29, and surrounding the teeth 29, I provide a flanged casing 30. One side of the said casing 30 is provided with a boss 31 thereon which boss is hollow and is externally threaded to receive a lock nut 32 and an internally threaded hollow handle portion 33.

The hollow handle portion 33 is formed on one end of a smaller diametered cylindrical handle 34, and a dog 35 is carried within the handle 34 and passing through the portion 33 and the boss 31 with the inner enlarged end 36 engaging with the teeth 29. A spring 37 is carried between the end 36 of the dog, and within the hollow handle portion 33, and the lock nut 32 is provided so that the hollow handle portion may be screwed in or out on the boss 31, to vary the tension of the spring 37, and to hold the said hollow portion from rotation after it has been set. The outer end of the dog 35 is provided with an enlarged hand grip portion 38, which portion is provided with a boss 39 on the inner side thereof, and the end of the handle 34 is provided with two oppositely diametered notches 40, adapted to receive the boss 39 when it is in either position. The dog may be turned a quarter turn with the boss 39 resting on the end of the handle 34, thereby disengaging the dog 35 from the teeth 29 of the casing 1.

The casing C is exernally threaded to be screwed into the outer casing D, and the threads 7 of the casing D and the threads on the casing C are fast threads formed as left hand threads, and of such a pitch that when either the casing C or the casing D are rotated, they will move quickly toward or away from each other. A locking member is provided for locking the casing C and D into an integral unit and this consists of pivoting locking bar 42 between lugs 43 on the frusto-control end of the casing C by a pivot pin 44, the dog end 45 of the member 42 being adapted to be inserted between external spaced lugs 46 formed on the perimeter of the casing D and held by spring 44′ so that when the dog 45 is placed between the lugs 46 the two casings C and D will be locked together and will rotate simultaneously when the handle 34 is operated by the user.

To operate the device a reamer E of the usual type is placed within the frusto-pyramidical portion of the casing C with the ball 27 engaging in a recess in the shank of the reamer E. The device is then attached to the pipe to be reamed by adaptation of the chuck jaws 16 and 17 and the lever 18, locking the entire device in axial alignment with the pipe A. The casing C is turned into the casing D to a point where the cutter blades of the reamer engage the burr B at which time the locking member 42 with its dog 45 is engaged between the lugs 46 and held there by the spring 44′ and then by grasping the handle in one hand the reamer is rotated and gradually fed into the end of the pipe A by the threads 9 on the cylinder 8. This is accomplished by rotating the handle 34 as desired. The construction of the handle 34 and the cooperating parts thereof provides a ratchet so that the handle may be rotated completely around the pipe or may be rotated part way, returned to the initial position or starting position, and again turned part way, as the dog will pass over the top of the teeth when the handle is rotating in one direction and will engage with the teeth when the handle is turned in the opposite direction. Also the direction in which the dog will engage with the teeth may be changed by drawing the end grip portion 38 out and turning the entire dog one-half turn in the handle 34. Perforations or ports may be provided in the casings through which cuttings of the burr may pass after they have been cut away from the pipe. Also an oil hole 50 is bored through the cap 33 into the interior thereof to provide for oiling the spring and dog of the ratchet.

Having thus described my invention, I desire to secure the Letters Patent and claim:

1. In a reaming tool of the class described, the combination of an internally threaded outer casing having one end constricted and also internally threaded; an inner externally threaded casing screwed into the outer casing having a frusto-conical socket formed in the end thereof; a reaming tool to fit into said socket; means to hold said reaming tool in fixed position in said socket while the device is in operation; a smaller cylindrical casing externally threaded to fit the threads of the constricted end of the outer casing, said smaller casing having the extreme outer end flanged outwardly; a chuck carried on said smaller cylindrical casing to hold the casing and the entire device concentric around the pipe; a spring held ratchet mounted around teeth formed on the perimeter of one end of the outer casing and adapted to rotate said outer casing when turned in one direction and to rotate around said casing when turned in the opposite direction; a handle by which said ratchet is rotated; and a hand grip secured to the frusto-conical end of the inner casing.

2. In a reaming tool of the class described, the combination of inner and outer casings screwed together with the inner casing formed with a frusto-conical end; a smaller cylindrical casing screwed into a constricted threaded end on the outer casing; means to grip a pipe concentrically within said smaller casing; means to lock the inner and outer casings into a single rotatable unit; and a ratchet mounted around teeth formed on the perimeter of the outer casing, said ratchet being adapted to rotate the inner and outer casings and the reaming tool simultaneously to cut the burr in the end of the pipe on which the entire device is mounted.

3. A device as set out in claim 2 including means to lock the reamer in operating position.

ALVIN L. ROMERO.